June 7, 1938.  U. G. DENSTEN  2,120,091
FOGLESS MIRROR FOR DENTAL AND LIKE USES
Filed Dec. 22, 1936
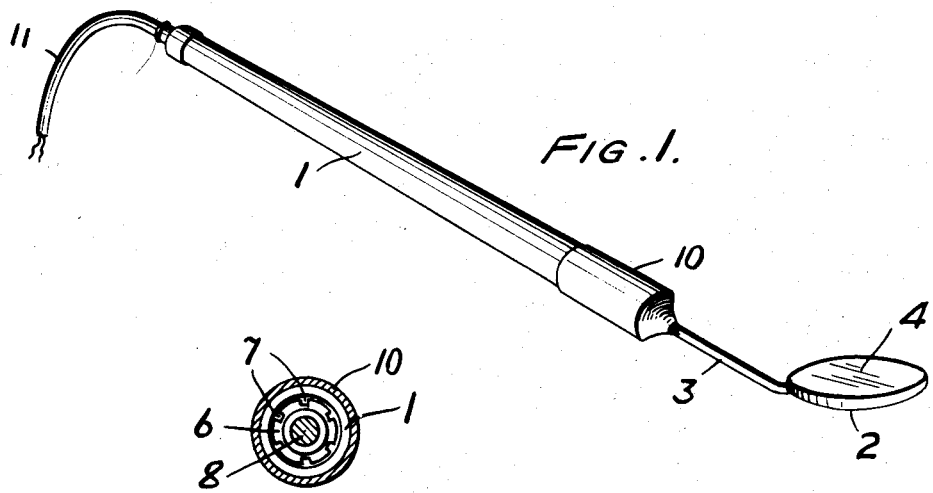
FIG. 1.
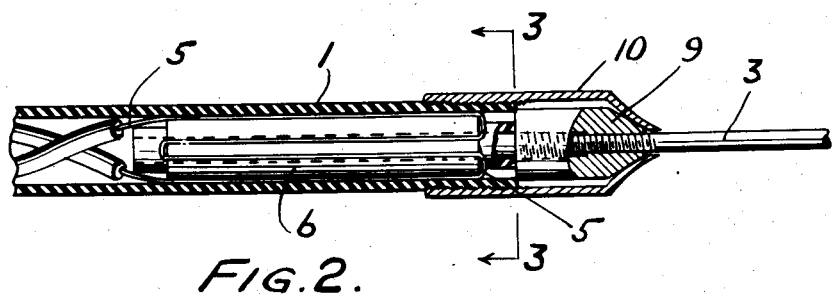
FIG. 3.
FIG. 2.
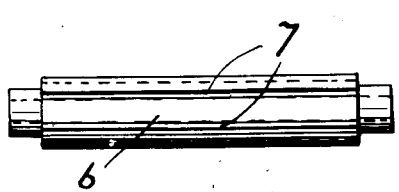
FIG. 4.
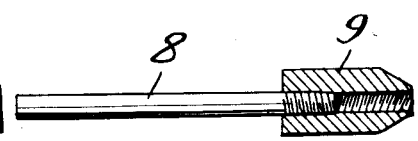
FIG. 5.
INVENTOR
Ulysses G. Densten
BY
Augustus B. Stoughton
ATTORNEY.
WITNESS:

Patented June 7, 1938

2,120,091

UNITED STATES PATENT OFFICE 2,120,091

FOGLESS MIRROR FOR DENTAL AND LIKE USES

Ulysses G. Densten, Haddon Heights, N. J.

Application December 22, 1936, Serial No. 117,142

2 Claims. (Cl. 88—104)

In the practice of dentistry and perhaps other branches of medicine mirrors are employed and they attain the temperature of the room but when they are inserted in the mouth or otherwise subjected to body heat which normally exceeds the temperature of the room, they are fogged and their utility impaired.

It is the principal object of the present invention to provide a mirror of the type specified which when exposed to body heat as by insertion in the mouth will not fog but will continue to reflect clearly and properly thus enabling the work to be continued satisfactorily without the necessity of wiping or otherwise clearing the mirror.

Other objects of the invention will appear from the following description at the end of which the invention will be claimed.

Generally stated the invention comprises an instrument for the use of dentists and doctors comprising a head provided with a mirror or image reflecting surface and having a heating unit in heat conducting relation to the reflecting surface of the mirror in order to keep the same at substantially the temperature of the body.

The invention also comprises the improvements to be presently described and finally claimed.

In the following description reference will be made to the accompanying drawing forming part hereof and in which, Figure 1 is a perspective view of an instrument embodying features of the invention.

Figure 2 is a transverse sectional view drawn to an enlarged scale of a portion of the same.

Figure 3 is a transverse sectional view taken on the line 3—3 of Figure 2.

Figure 4 is a detached view of some of the parts illustrated in Figure 2; and

Figure 5 is a detached view partly in section showing others of the elements of the device.

Referring to the drawing, 1 indicates the stem or handle of the instrument and 2 indicates the head of the instrument. The head and shank 3 of the instrument are made of metal and there is provided a reflecting surface 4 which may be a mirror. The stem 1 of the instrument is hollow and contains a heating unit shown as turns of resistance wire 5 mounted on a sleeve 6, for example, of Bakelite or like material. Bakelite is an example of a material which is electrically insulating but heat conducting. As shown in the drawing the turns 5 of resistance wire are mounted in grooves 7. There is a metal rod or heat conducting rod that extends into the sleeve 6 into position to be heated by the heating unit. This rod 8 is provided with a suitable coupling 9 of metal with which the metal shank 3 has threaded connection. The cap 10 engages the coupling and also the stem 1 and retains the parts in assembled position. The head 2 may, therefore, be detached from the stem 1 when it is necessary or desirable to do so. The cable 11 is a means for connecting the resistance wire 5 in the circuit of a battery or transformer circuit. The heat imparted to the instrument by the heating unit is appropriate for maintaining the temperature of the head or more accurately its reflecting surface at substantially the temperature of the mouth into which the head is inserted when the instrument is used by dentists in order to inspect the back of the teeth or work being done at the back of the teeth.

From the foregoing description it is evident that the mirror will not fog when exposed to the temperature of the body or mouth, as the case may be, and that this is due to the provision of a heating unit in heat conducting relation to the reflecting surface, for example by way of the rod 8, coupling 9, shank 3, and head 2, all of which are made of metal or other good heat conducting material. Since this is the fact it is evident that the details of construction of the heating unit are not important, although a resistance wire heating unit can be readily mounted in the hollow stem of the instrument and conveniently maintained at a limited temperature by means of an electric current. However, an electric heating unit is an example of what I believe to be at this time the best means for practicing the invention.

It will be obvious to those skilled in the art to which the invention relates that modifications may be made in details of construction and arrangement without departing from the spirit of the invention which is not limited as to such matters or otherwise than the prior art and the appended claims may require.

I claim:

1. In an instrument of the type recited the combination of a head and its shank of heat conducting material, said head having a mirror, a stem, a grooved sleeve mounted in the stem, and of electrically insulating and heat conducting material, a resistance conductor mounted in the grooves of the sleeve, circuit connections extending through one end of the stem and connected to the conductor, a rod of heat conducting material mounted in the sleeve and projecting through the other end of the stem, a coupling connecting the rod and shank and of heat conducting material, and a cap covering the coupling and engaging the stem.

2. A fogless mirror for dentists and the like comprising, a hollow tubular stem, a hollow sleeve of electrically insulating but heat-conducting material located within said stem, an electric heating unit supported by said sleeve within said stem, a metal supporting element located within said sleeve and within said stem and projecting therefrom, and a reflecting surface carried by the projecting end of said supporting element and adapted to receive heat from said heating unit by conduction along said supporting element.

ULYSSES G. DENSTEN.